United States Patent
Elias

(10) Patent No.: US 11,151,239 B2
(45) Date of Patent: Oct. 19, 2021

(54) SINGLE SIGN-ON MANAGEMENT FOR MULTIPLE INDEPENDENT IDENTITY PROVIDERS

(71) Applicant: Red Hat, Inc., Raleigh, NC (US)

(72) Inventor: Vlastimil Elias, Brno (CZ)

(73) Assignee: RED HAT, INC., Raleigh, NC (US)

( * ) Notice: Subject to any disclaimer, the term of this patent is extended or adjusted under 35 U.S.C. 154(b) by 197 days.

(21) Appl. No.: 15/722,339

(22) Filed: Oct. 2, 2017

(65) Prior Publication Data

US 2019/0102534 A1    Apr. 4, 2019

(51) Int. Cl.
| | | |
|---|---|---|
| G06F 21/41 | (2013.01) | |
| H04L 29/06 | (2006.01) | |
| G06F 21/62 | (2013.01) | |
| H04L 29/08 | (2006.01) | |

(52) U.S. Cl.
CPC .......... G06F 21/41 (2013.01); H04L 63/0815 (2013.01); *G06F 21/6218* (2013.01); *H04L 63/205* (2013.01); *H04L 67/02* (2013.01)

(58) Field of Classification Search
CPC .. G06F 21/41; G06F 63/0815; G06F 21/6218; H04L 63/0815; H04L 63/0884; H04L 63/10; H04L 63/205; H04L 67/02
See application file for complete search history.

(56) References Cited

U.S. PATENT DOCUMENTS

| | | | |
|---|---|---|---|
| 8,832,271 B2 | 9/2014 | McCarty | |
| 9,413,750 B2 | 8/2016 | Akula et al. | |
| 9,876,859 B1 * | 1/2018 | Plummer | H04L 67/143 |
| 10,320,771 B2 * | 6/2019 | Hande | H04L 63/0815 |
| 2004/0125756 A1 * | 7/2004 | Lepore | H04L 29/06027 370/261 |
| 2005/0005014 A1 * | 1/2005 | Holmes | H04L 29/06 709/227 |

(Continued)

FOREIGN PATENT DOCUMENTS

CN    101771534 B    2/2012

OTHER PUBLICATIONS

Czaja, Filip, "IDP Initiated SSO and Identity Federation with OpenAM and SAML—Part I", Microsoft Polska, http://fczaia.blogspot.in/2012/06/idp-initiated-sso-and-identity.html, 4 pgs.

(Continued)

*Primary Examiner* — Tongoc Tran
(74) *Attorney, Agent, or Firm* — Haynes and Boone, LLP

(57) ABSTRACT

A method includes, with a computing system associated with a first local identity provider of a plurality of local identity providers, receiving a first authentication request from a first web application of a user device. The method further includes, with the computing system, redirecting a browser associated with the first web application to a server system associated with a master identity provider. The method further includes, with the computing system, receiving from the browser, a master session identifier provided by the master identity provider, the master session identifier identifying a master single sign-on session that is available to the plurality of local identity providers. The method further includes, with the computing system, establishing a first local single sign-on session between the first local identity provider and the browser.

15 Claims, 10 Drawing Sheets

(56) References Cited

U.S. PATENT DOCUMENTS

| | | | | |
|---|---|---|---|---|
| 2006/0155993 | A1* | 7/2006 | Busboon | G06F 21/31 |
| | | | | 713/169 |
| 2008/0319744 | A1* | 12/2008 | Goldberg | G10L 15/01 |
| | | | | 704/235 |
| 2010/0043065 | A1* | 2/2010 | Bray | G06F 21/41 |
| | | | | 726/8 |
| 2012/0011567 | A1* | 1/2012 | Cronk | H04L 63/102 |
| | | | | 726/4 |
| 2012/0179828 | A1* | 7/2012 | Kobayashi | G06F 21/44 |
| | | | | 709/227 |
| 2013/0042618 | A1* | 2/2013 | Zhan | F02B 63/06 |
| | | | | 60/720 |
| 2013/0133056 | A1* | 5/2013 | Taylor | G06F 21/41 |
| | | | | 726/8 |
| 2014/0201809 | A1* | 7/2014 | Choyi | H04W 12/0608 |
| | | | | 726/3 |
| 2014/0350954 | A1* | 11/2014 | Ellis | G16H 50/20 |
| | | | | 705/2 |
| 2015/0178298 | A1* | 6/2015 | Ish-Hurwitz | G06F 16/954 |
| | | | | 715/234 |
| 2016/0050234 | A1 | 2/2016 | Choyi et al. | |
| 2016/0134619 | A1 | 5/2016 | Mikheev et al. | |
| 2016/0366120 | A1* | 12/2016 | Rykowski | H04L 63/0815 |
| 2016/0366122 | A1* | 12/2016 | Rykowski | H04W 12/06 |
| 2017/0289134 | A1* | 10/2017 | Bradley | H04L 63/105 |
| 2018/0077144 | A1* | 3/2018 | Gangawane | H04L 63/102 |
| 2018/0152440 | A1* | 5/2018 | Hande | H04L 9/3213 |
| 2019/0020646 | A1* | 1/2019 | Magyar | G06F 21/41 |

OTHER PUBLICATIONS

"Test Security on the Cloud (with a Local Identity Provider)", SAP Cloud Platform, https://help.sap.com/viewer/65de297705c403bbc107264b8eccf4b/Cloud/en-US/754818ea6387ea38843ab0ed1929765.html, 6 pgs.

'IDP-initiated Single Sign-On POST Brinding', samlxml.org, http://saml.xml/org/wiki/idp-initiated-single-sign-on-post-binding, 2 pgs.

\* cited by examiner

SINGLE SIGN-ON MANAGEMENT FOR MULTIPLE INDEPENDENT IDENTITY PROVIDERS

BACKGROUND

The present disclosure relates generally to server systems associated with identity providers, and more particularly, multiple, independent identity providers that provide users with single sign-on (single sign-on) sessions.

Various online services typically use access control to protect users who interact with such services. Access control involves an authentication process and an authorization process. The authentication process typically involves requesting credentials from a user (e.g., username/password). The authorization process involves specifying rights and privileges to a particular user.

In some cases, a particular software application may have multiple independent software systems that are related. It would be inconvenient for a user to have to log in through each of these software systems. Accordingly, such systems may utilize single sign-on technologies that allow a user to login with credentials to gain access to several systems without having to log in to each separate software system. Single sign-on typically involves a single identity provider that authenticates users across multiple systems and creates a single sign-on session.

In more complicated software solutions, management of single sign-on functionality can be difficult. For example, the performance of the identity provider may degrade for large systems. It may be difficult for multiple large development teams to maintain an identity provider for various software systems. Moreover different software systems, such as different web applications, may often have different needs. Accordingly, it is desirable to more efficiently manage single sign-on technologies for large software environments.

SUMMARY

According to one example, a method includes, with a computing system associated with a first local identity provider of a plurality of local identity providers, receiving a first authentication request from a first web application of a user device. The method further includes, with the computing system, redirecting a browser associated with the first web application to a server system associated with a master identity provider. The method further includes, with the computing system, receiving from the browser, a master session identifier provided by the master identity provider, the master session identifier identifying a master single sign-on session that is available to the plurality of local identity providers. The method further includes, with the computing system, establishing a first local single sign-on session between the first local identity provider and the browser.

According to one example, a method includes, with a computing system associated with a master identity provider, receiving an authentication request from a browser of a user device on behalf of a first web application. The method further includes, with the computing system, determining that no master single sign-on session exists for a user associated with the browser. The method further includes, with the computing system, determining that no master single sign-on session exists for a user associated with the browser. The method further includes, with the computing system, in response to the determining, instructing a local identity provider to obtain credentials from the user. The method further includes, with the computing system, receiving local single sign-on session information from the local identity provider. The method further includes, with the computing system, creating a master single sign-on session.

According to one example, a computing system associated with a local identity provider includes a processor and a memory with machine readable instructions that when executed by the processor, cause the system to receive a first authentication request from a first web application of a user device, redirect a browser associated with the first web application to a server system associated with a master identity provider, and receive from the browser, a master session identifier provided by the master identity provider. The master session identifier identifies a master single sign-on session that is available to a plurality of local identity providers. The system is further to establish a first local single sign-on session between the local identity provider and the browser.

Figure 1:
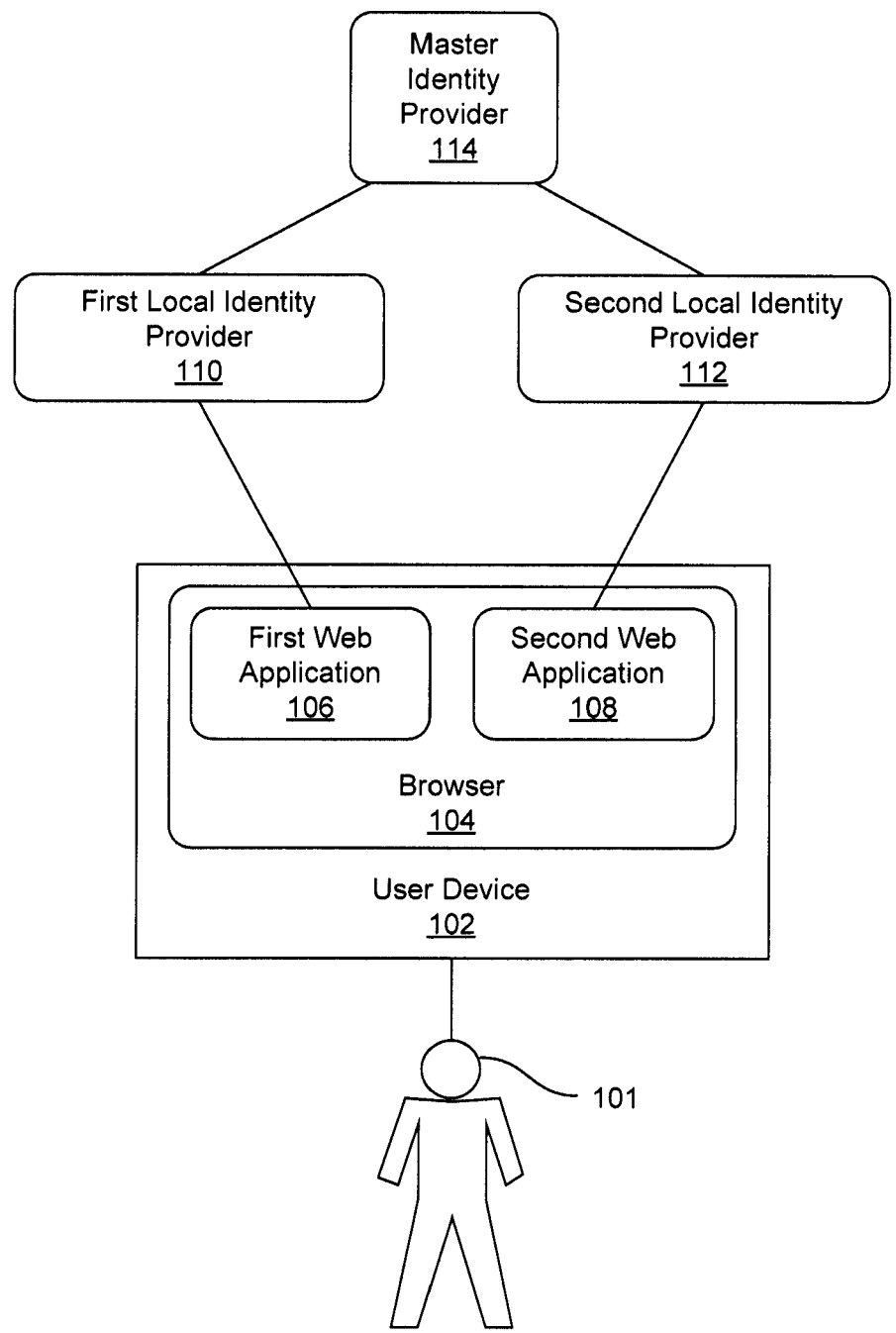
FIG. 1 is a diagram showing a plurality of local identity providers and a master identity provider, according to one example of principles described herein.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

As described above, in more complicated software solutions, management of single sign-on functionality can be difficult. For example, the performance of the identity provider may degrade for large systems. Moreover, it may be difficult for multiple large development teams to maintain an identity provider for multiple software systems. Moreover different software systems, such as different web applications, may often have different needs. Accordingly, it is desirable to more efficiently manage single sign-on technologies for large software environments.

According to principles described herein, instead of having a single identity provider that manages a single sign-on session for multiple software applications, a plurality of identity providers work with a master identity provider to provide single sign-on functionality for the multiple software applications. In one example, each of the different software applications may work with a different identity provider. For purposes of discussion the identity providers will be referred to as local identity providers to distinguish them from the master identity provider. The master identity provider may be transparent to the user. In other words, the user may only interact with the local identity providers. The local identity providers, in turn, may then work with the master identity provider.

In one example, a user may request a particular action through a web application running on a browser. The web application may then redirect the browser to a local identity provider associated with the web application. If there is already a single sign-on session in place for that web application, then no further action may be taken regarding authentication. However, if there is no local single sign-on session in place, the browser may be redirected to a master identity provider. If there is a master single sign-on session in place, the local identity provider may then be provided with the session identifier for the master single sign-on session. If there is no master single sign-on session in place, then one may be created. The local identity provider may then authenticate the user and the web application may proceed with that authentication. With the master single sign-on session in place, the user may use other applications that use other local identity providers that will then use the master single sign-on session.

Use of principles described herein may provide a number of advantages. For example, each separate local identity provider may be specially designed for a particular web application. This allows the local identity providers to better serve their respective web applications yet still work with each other to provide single sign-on functionality. By allowing each of the local identity providers to better serve their respective web applications, both the web applications and the identity providers may operate more efficiently. This allows the computer systems underlying the web applications and identity providers to make better use of computing resources and thus improve their performance.

FIG. 1 is a diagram showing a plurality of local identity providers 110, 112 and a master identity provider 114. According to the present example, a user device 102 includes a web browser 104. The web browser 104 runs a first web application 106 and a second web application 108. The first web application 106 is designed to authenticate with a first local identity provider 110. Similarly, a second web application 108 is designed to authenticate with a second local identity provider 112. Both the first local identity provider 110 and a second local identity provider 112 are in communication with a master identity provider 114.

The user device 102 may be one of a variety of electronic computing devices. For example, the user device 102 may be a desktop computing device, laptop computing device, tablet device, or a mobile phone device. The user device 102 thus provides output systems for display to a user 101 such as a monitor or touchscreen device. The user device 102 also provides input systems to receive information from the user such as a touchscreen, keyboard, or mouse.

The web browser 104 is a software application that runs on the user device 102. The web browser 104 obtains web content over a network such as the Internet. The web browser 104 then renders that content for display to a user. The web browser 104 is designed for use with various web technologies such as hypertext transfer protocol (HTTP), hypertext markup language (HTML), JavaScript, and other web technologies.

A web application is one that is designed to run through a browser. Web applications typically have a client/server architecture. Specifically, the web application acts as a client and communicates with a server over a network such as the Internet. Web applications may include email applications, e-commerce applications, instant messaging applications, and other various applications. Such web applications often require user to log in using a username and password so as to create a secure session between the web application and the server with which it communicates. In some examples, two separate web applications may be related and may have a similar user base. In other words, the first web application 106 may be related to the second web application 108 such that a single sign-on session would be convenient for the user. In other words, it would be convenient for the user to log in through one web application and not have to log in to the other.

When a user logs in through a web application 106, 108, the web application is configured to use a local identity provider 110, 112. A local identity provider 110, 112 may be a software function that runs on one or more computing systems such as servers. An identity provider 110, 112 provides users with identifiers for interaction with the particular system. Thus, the identity provider can verify to the particular system that a particular identifier is known to the identity provider. The identity provider may use one of a variety of mechanisms to perform this task. For example, the identity provider may use a username and password system. Alternatively, the identity provider may use a client certificate. The identity provider may also use a social login. A social login is one that uses a social networking service to provide an identifier.

While the two local identity providers 110, 112 are separate, they may both rely on a master identity provider 114. For example, if a user logs in with the first local identity provider 110, the first local identity provider 110 may pass that login information to the master identity provider to create a master single sign-on session. When the user attempts to perform an action with the second application that requires authentication, the browser may consult the second local identity provider 112. In turn, the second local identity provider 112 may first consult the master identity provider and use the master session identifier to authenticate the user. Thus, even though different local identity providers are used, the single sign-on functionality can still be provided.

In some examples, each of the local identity providers 110, 112 and the master identity provider 114 share the same user base. This user base may be shared using shared storage or replication. In some examples, any user interactions are done through the local identity providers 110, 112 only. The local identity providers 110, 112 then communicate with the master identity provider 114. In other words, the master identity provider 114 is completely transparent to the user. In some examples, after a local single sign-on session has been established between a web application 106, 108 and its local identity provider 110, 112, all authentication requests from the web application go through that local single sign-on session and the master single sign-on session is no longer used. In some examples, any communication between the web applications 106, 108 and the local identity providers 110, 112 are secured using protocols such as SAML, OpenID connect, and OAuth. Similarly, communication between the local identity providers 110, 112 in the master identity provider 114 are secured such protocols. In some examples, either the local identity providers 110, 112 and/or the master identity provider 114 may use clustering to improve performance and resilience. In other words, either identity provider may be embodied as multiple server systems working in concert to provide their respective functionalities.

Figure 2A:
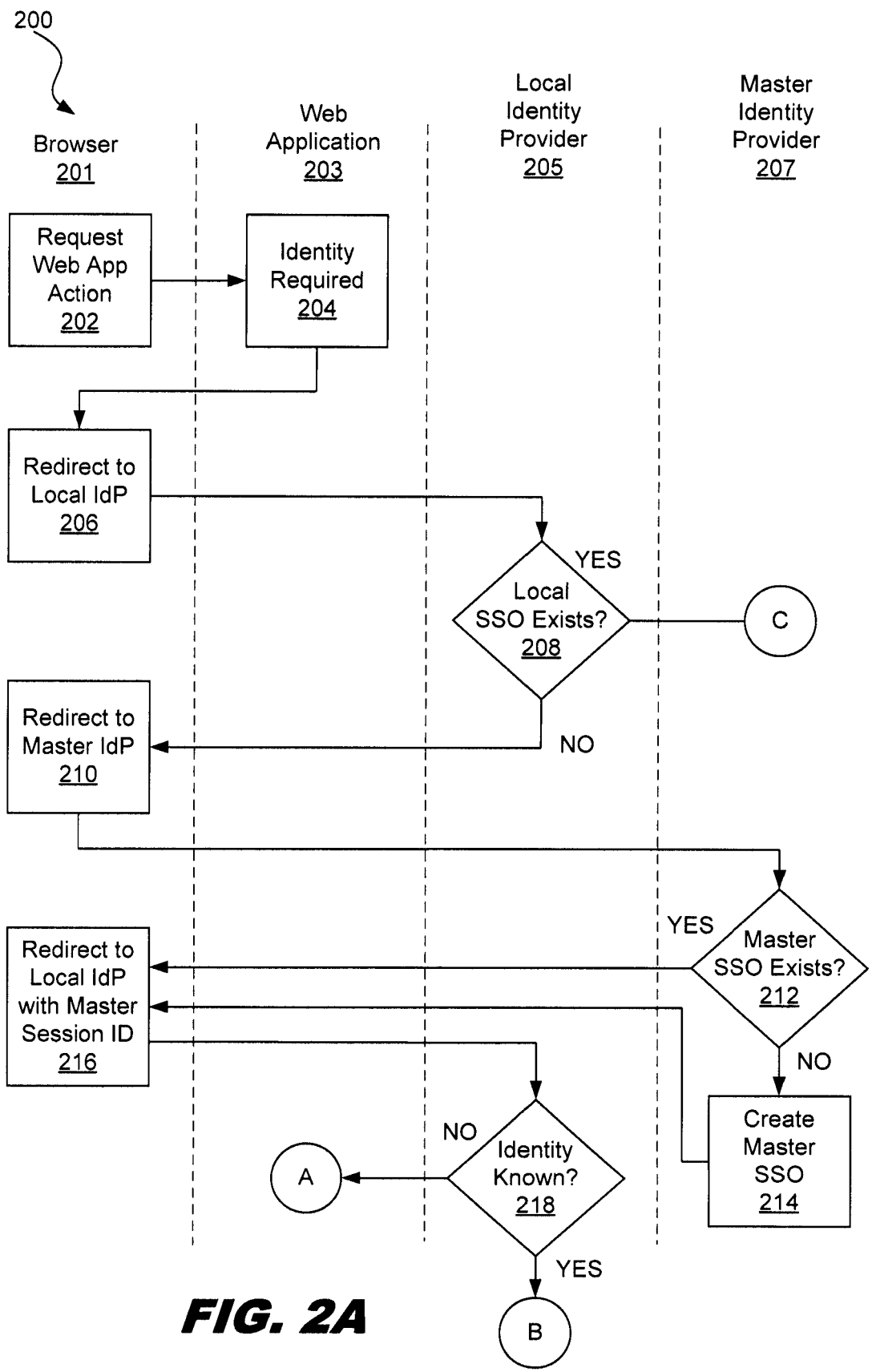
FIGS. 2A and 2B are a flow diagram showing an illustrative method for managing single sign-on sessions, according to one example of principles described herein.
Figure 2B:
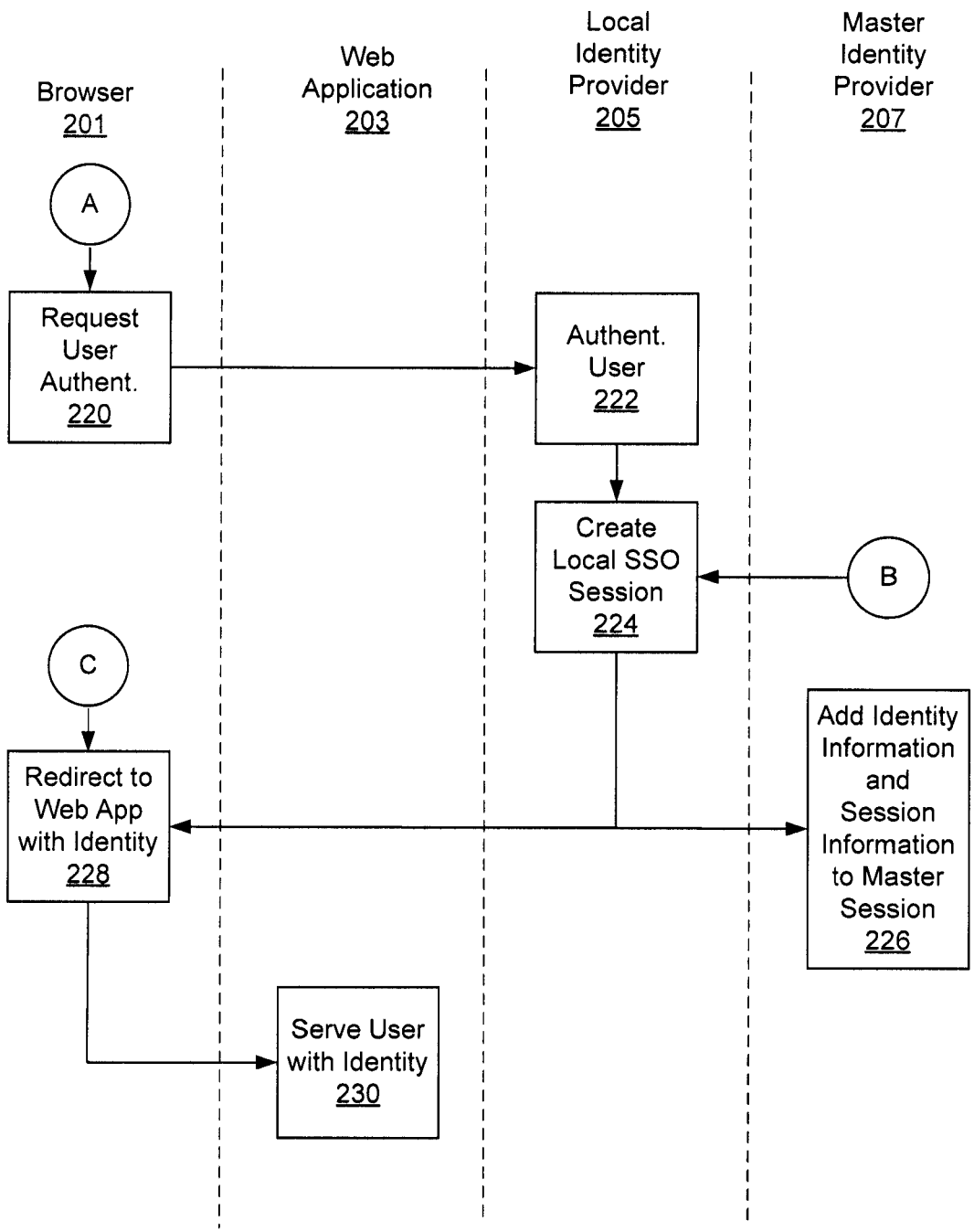

FIGS. 2A and 2B illustrate a flow diagram showing a method 200 for managing single sign-on sessions. According to the present example, the method 200 involves interactions between a browser 201, a web application 203, a local identity provider 205, and a master identity provider 207. The browser 201 may correspond to the browser 104 described above. Similarly, the web application 203 may correspond to one of the web applications 106, 108 described above. The local identity provider 205 may correspond to one of the local identity providers 110, 112 described above. The master identity provider 207 may correspond to the master identity provider 114.

According to the present example, at step 202, the browser 201 requests an action from the web application 203. For example, the user may enter a particular uniform resource locator (URL) into the browser. Such URL may be associated with the web application 203.

At process 204, the web application 203 may determine that an identity is required before the requested action can proceed. For example, the web application 203 may determine the action requested should be secure and the identity of the person requesting the action should be verified. Accordingly, the web application 203 redirects the browser 201 to the local identity provider 205 at step 206.

At step 208, the local identity provider 205 determines whether a local single sign-on session exists. A local single sign-on session may already exist, for example, if the user has already logged in or otherwise authenticated with the local identity provider 205. This may have been done through the web application 203 or another web application running on the browser 201.

If it is determined, at step 208, that no local single sign-on session exists, the local identity provider 205 redirects the browser 201 to the master identity provider 207 at step 210. At step 212, it is determined whether a master single sign-on session exists. A master single sign-on session may already exist, for example, if the user has already authenticated with a different local identity provider and that different local identity provider provided the master identity provider 207 with single sign-on session information. The different local identity provider may have interacted with the master identity provider 207 in the manner described herein to create the master single sign-on session.

If it is determined at step 212 that no master single sign-on session exists, the method 200 proceeds to step 214. At step 214, a master single sign-on session is created. After the new master single sign-on session is created, the master at any provider 207 provides the browser 201 with the master session identifier. The master session identifier may be a randomly generated numeric or alphanumeric string value that identifies a particular session. In some examples, the master identity provider 207 may be aware of the identity of the user attempting to access the web application 203. However, in some examples, the master identity provided to a seven may not be aware of the user's identity.

At step 216, the browser 201 remembers master session identifier for subsequent use (e.g., in step 212 of future interactions). and is redirected to the local identity provider 205. The local identity provider 205 is also provided with the master session identifier. At step 218 it is determined whether the identity of the user is known (provided from master single sign-on session by master identity provider). If the user's identity is not known, the browser 201 requests authentication from the user at step 220. For example, the browser 201 may prompt the user for a username and password. Other means of authentication are also contemplated. At step 222, the local identity provider 205 authenticates the user using the credentials provided by the user.

At step 224 the local identity provider 205 creates a local single sign-on session. If it is determined at step 218 that the user's identity is already known, the method 200 proceeds to step 224, thus skipping the authentication steps 220, 222. After the local single sign-on session is created, the local identity provider 205 redirects the browser 201 back to the web application 203 with the user's identity at step 228. The browser may remember the local session identifier at this point for subsequent use (e.g., in step 208 of future interactions). At step 230, the web application 203 can then serve the user as intended using the user's identity.

Additionally, after the local single sign-on session is created at step 224, the local identity provider 205 may send identity information and session information to the master identity provider 207 at step 226. In some examples, this is done through a front channel. In other words, the local identity provider 205 provides information to the browser 201, which then sends the information to the master identity provider 207. In some examples, a back channel may be used. In other words, the local identity provider 205 may transmit the information directly to the master identity provider 207. The master identity provider 207 may then associate the local single sign-on session information and user identity with the master session information.

Additionally, if it is determined at step 208, the local single sign-on session already exists, the method proceeds directly to step 228. In some examples, if it is determined at step 208 that there is no single sign-on session already in place, the local single sign-on session may be created at that time instead of at step 224. In such case, the local single sign-on session may be created without identity, and the identity may be added at a subsequent time, such as after authentication step 222 or after the identity is received from the master identity provider in step 218.

Figure 3A:
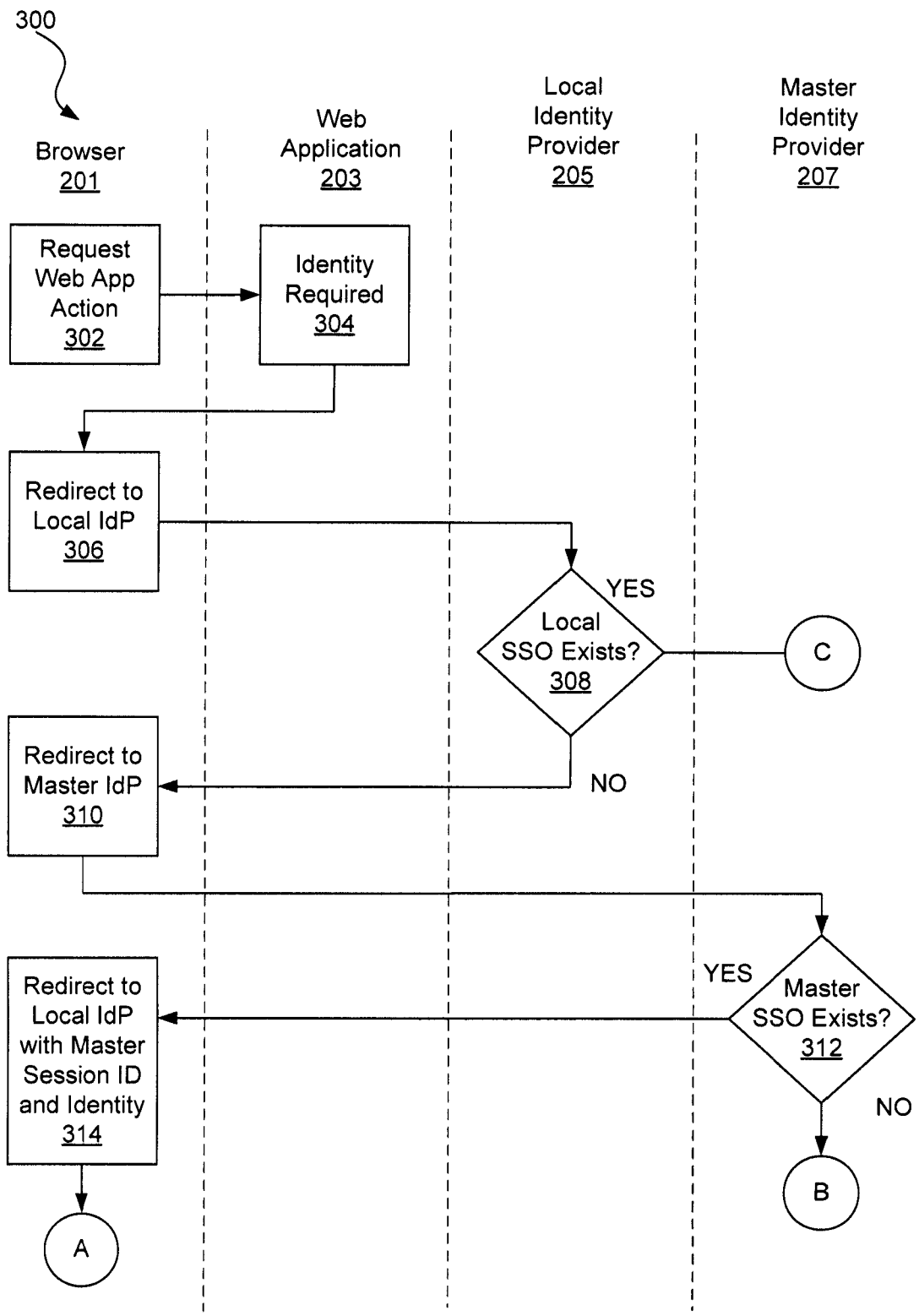
FIGS. 3A and 3B are a flow diagram showing an illustrative method for managing single sign-on sessions, according to one example of principles described herein.
Figure 3B:
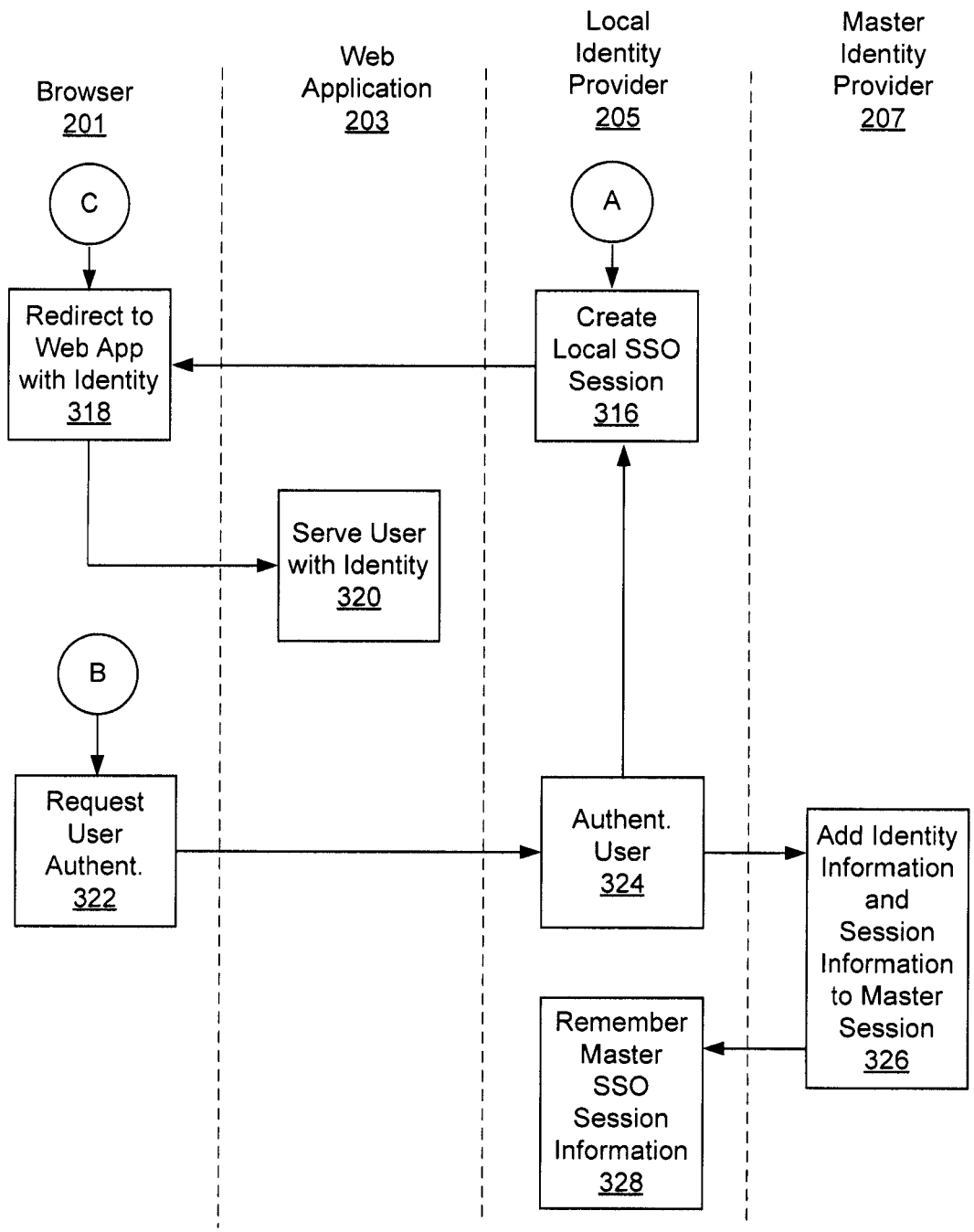

FIGS. 3A and 3B are a flow diagram showing an illustrative method for managing single sign-on sessions. According to the present example, at process 302, the browser 201 requests an action from the web application 203. For example, the user may enter a particular uniform resource locator (URL) into the browser. Such URL may be associated with a particular web application.

At process 304, the web application 203 may determine that an identity is required before the requested action can proceed. For example, the web application 203 may determine the action requested should be secure and the identity of the person requesting the action should be verified. Accordingly, the web application 203 redirects the browser 201 to the local identity provider 205 at step 306.

At step 308, the local identity provider 205 determines whether a local single sign-on session exists. A local single sign-on session may already exist, for example, if the user has already logged in or otherwise authenticated with the local identity provider 205. This may have been done through the web application 203 or another web application running on the browser 201.

If it is determined, at step 308, that no local single sign-on session exists, the local identity provider 205 redirects the browser 201 to the master identity provider 207 at step 310. At step 312, it is determined whether a master single sign-on session exists. A master single sign-on session may already exist, for example, if the user has already authenticated with a different local identity provider and that different local identity provider provided the master identity provider 207 with single sign-on session information.

If it is determined at step 312 that a master single sign-on session already exists, then the method 300 proceeds to step 314. At step 314, the browser 201 is redirected to the local identity provider 205. Additionally, the browser 201 receives the master session identifier and the identity of the user from the master identity provider 207. Both the master session identifier and the user identity are provided to the local identity provider 205.

At step 316, the local identity provider 205 creates a local single sign-on session. After the local single sign-on session is created, the local identity provider 205 redirects the browser 201 back to the web application 203 with the user's identity at step 318. The browser remembers the local session identifier for subsequent use (e.g., in step 308 of future interactions). At step 320, the web application 203 can then serve the user as intended using the user's identity.

If it is determined at step 312 that no master single sign-on session already exists, the method 300 proceeds to step 322. Step 322 should be redirect of the browser from master IdP to local IdP which then asks user for the authentication! At step 322, the browser 201 is redirected from the master identity provider 207 to the local identity provider 205 and the browser 201, upon instruction from the local identity provider 205, requests authentication from the user. For example, the browser 201 may prompt the user for a username and password. Other means of authentication are also contemplated. At step 324, the local identity provider 205 authenticates the user using the credentials provided by the user.

After the user has been authenticated, the local identity provider 205 creates a local single sign-on session, and sends identity information and local session information to the master identity provider 207 at step 326. In other words, the local identity provider 205 provides information to the browser 201, which remembers the local session identifier for 1 subsequent use (e.g., in step 308 of future interactions), and then sends the local session and user's identity information to the master identity provider 207 by browser redirect. The master identity provider 207 may then create a master single sign-on session and associate the local single sign-on session information and user identity with the master session information. Then, the master identity provider redirects the browser 201 back from the master identity provider to the local identity provider. The browser may also remember the master session identity for subsequent use (e.g., in step 312 of future interactions).

That way, any subsequent requests from the browser to authenticate the user can use this master single sign-on session information. Then local IdP returns control to Web App (step 318).

Additionally, if it is determined at step 308, that the local single sign-on session already exists, the method proceeds directly to step 318. In some examples, if it is determined at step 308 that there is no single sign-on session already in place, the local single sign-on session may be created at that time instead of at step 316. In such case, the local single sign-on session may be created without identity, and the identity may be added at a subsequent time, such as after authentication step 324.

The methods 200, 300 described above may also be used with passive authentication. In such examples, the web application may look to see if user identity is known thanks to single sign-on session exists. However, if no single sign-on session exists, the user may not be prompted for credentials. Instead, the web application 203 may proceed without the user's identity. The user identity may be checked in both the local identity provider and the master identity provider.

Figure 4:
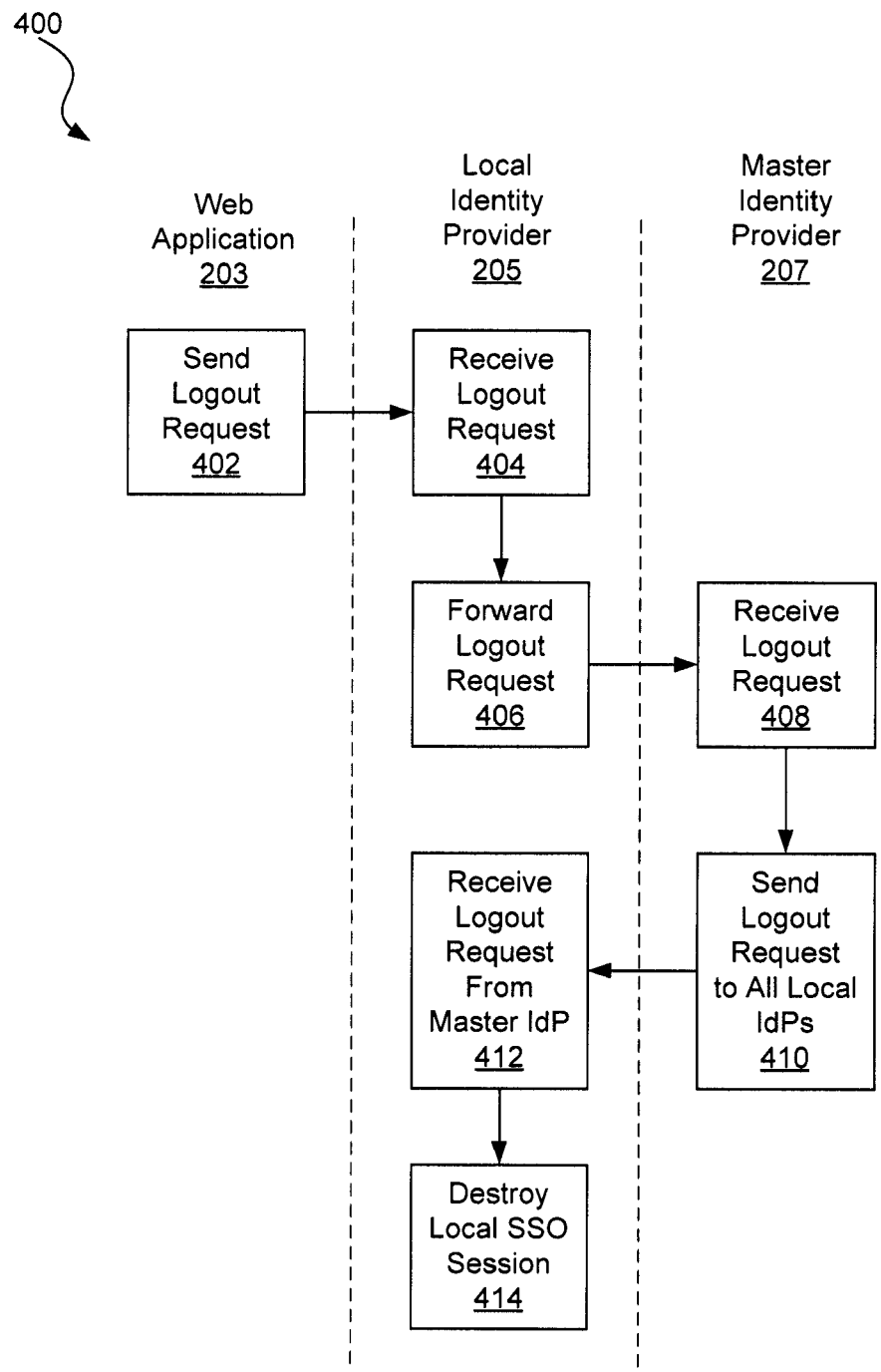
FIG. 4 is a flow diagram showing a logout process for a master single sign-on session, according to one example of principles described herein.

FIG. 4 is a flow diagram showing a logout process for a master single sign-on session. According to the present example, the method 400 involves the web application 203, the local identity provider 205, and the master identity provider 207. In the present example the method 400 begins at step 402, or the web application 203 send a logout request. This logout request is sent to the local identity provider 205. At step 404, the local identity provider receives the logout request. At step 406, the local identity provider 205 sends the request to the master identity provider 207. Both a front channel or a back channel method may be used here.

At step 408, the master identity provider 207 receives the logout request from the local identity provider 205. The master identity provider 207, at step 410, then sends the logout request to each of the local identity providers associated with that master identity provider 207. Thus, the logout request is sent to the local identity provider 205, and any other local identity providers associated with the master identity provider 207. The master identity provider may then destroy the master single sign-on session.

At step 412, the local identity provider 205 receives the logout request from the master identity provider. The local identity provider 205 and destroys the local single sign-on session indicated by the logout request at step 414. Any other local identity providers that receive the logout request from the master identity provider will also destroy any local single sign-on sessions associated with those local identity providers. The master identity provider may also destroy the master single sign-on session. In some examples, the master identity provider maintains an association between the master single sign-on session and the local sign-on sessions. This allows the master identity provider to logout of all local identity single sign-on sessions.

Figure 5:
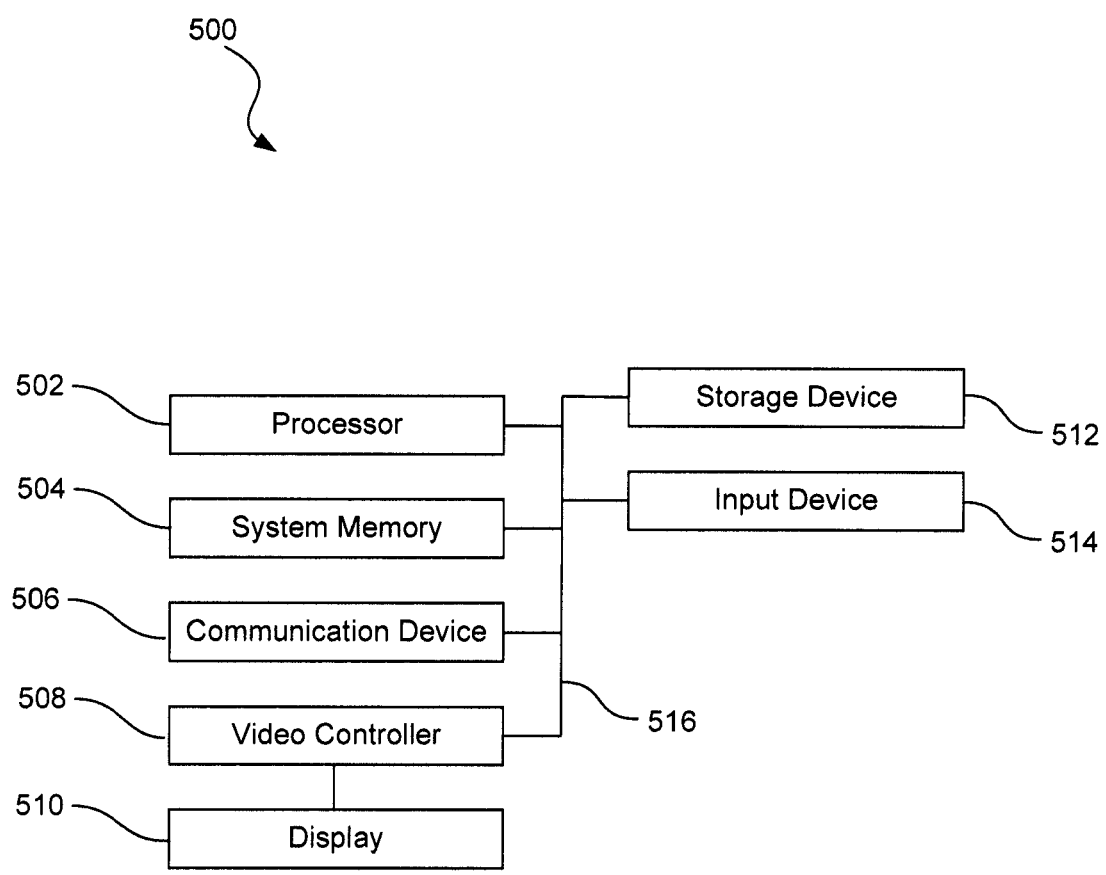
FIG. 5 is a diagram showing an illustrative computing system for single sign-on management, according to one example of principles described herein.

FIG. 5 is a diagram showing an illustrative computing system for single sign-on management. For example, the computing system 500 may be associated with a server underlying either a local identity provider or a master identity provider. Additionally, the computing system 500 may be associated with the user device running web applications that interact with the local identity provider.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary examples, software encompasses any set of instructions capable of being executed on a computing device such as, for example, on a client machine or server.

In some examples, combinations of software and hardware could also be used for providing enhanced functionality and performance for certain examples of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary examples of the present disclosure may be embodied in the RAM of a computing device to transform a standard computer into a new specific computing machine. In some examples, data structures are defined organizations of data that may enable an example of the present disclosure. In an exemplary example, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary examples, data may be mapped. In some examples, mapping is the process of associating one data entry with another data entry. In an exemplary example, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary examples, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Figure 6:
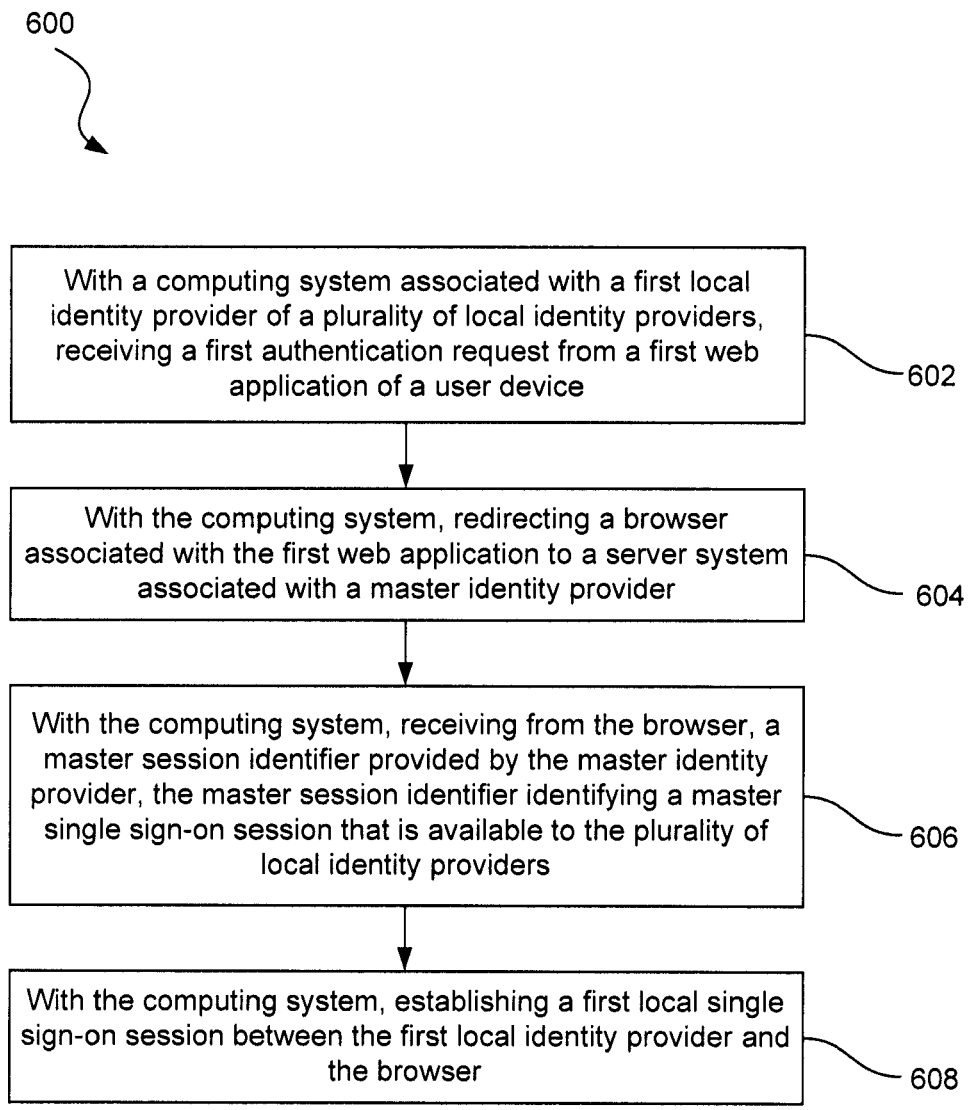
FIG. 6 is a flowchart showing an illustrative method for single sign-on management, according to one example of principles described herein.

FIG. 6 is a flowchart showing an illustrative method for single sign-on management. According to the present example, the method 600 includes a step 602 for, with a computing system associated with a first local identity provider of a plurality of local identity providers, receiving a first authentication request from a first web application of a user device. The method 600 further includes a step 604 for, with the computing system, redirecting a browser associated with the first web application to a server system associated with a master identity provider. The method 600 further includes a step 606 for, with the computing system, receiving from the browser, a master session identifier provided by the master identity provider, the master session identifier identifying a master single sign-on session that is available to the plurality of local identity providers. The method 600 further includes a step 608 for, with the computing system, establishing a first local single sign-on session between the first local identity provider and the browser.

Figure 7:
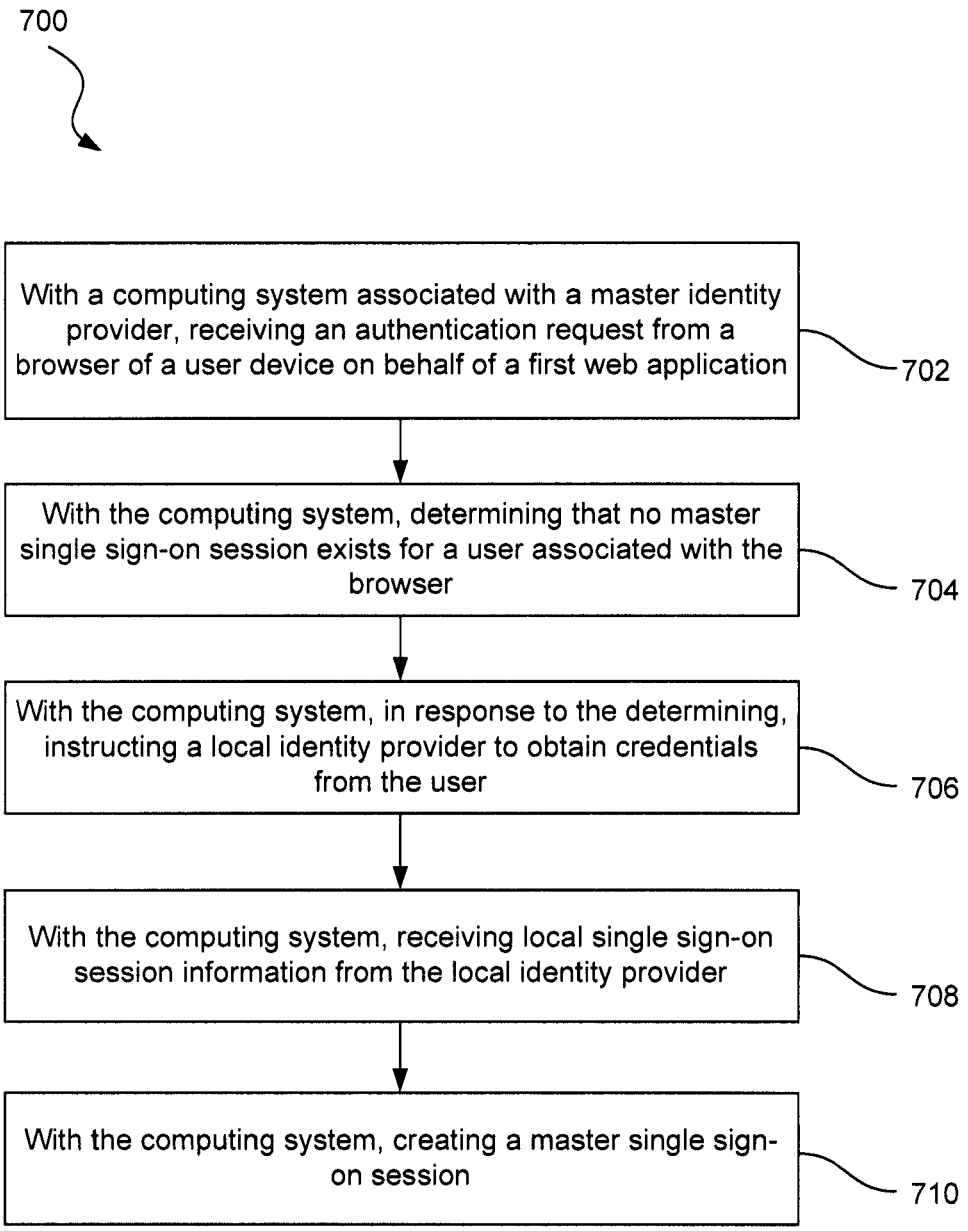
FIG. 7 is a flowchart showing an illustrative method for single sign-on management, according to one example of principles described herein.

FIG. 7 is a flowchart showing an illustrative method for single sign-on management. According to the present example, the method 700 includes a step 702 for, with a computing system associated with a master identity provider, receiving an authentication request from a browser of a user device on behalf of a first web application. The method 700 further includes a step 704 for, with the computing system, determining that no master single sign-on session exists for a user associated with the browser. The method 700 further includes a step 706 for, with the computing system, in response to the determining, instructing a local identity provider to obtain credentials from the user. The method 700 further includes a step 708 for, with the computing system, receiving local single sign-on session information from the local identity provider. The method 700 further includes a step 710 for, with the computing system, creating a master single sign-on session.

Figure 8:
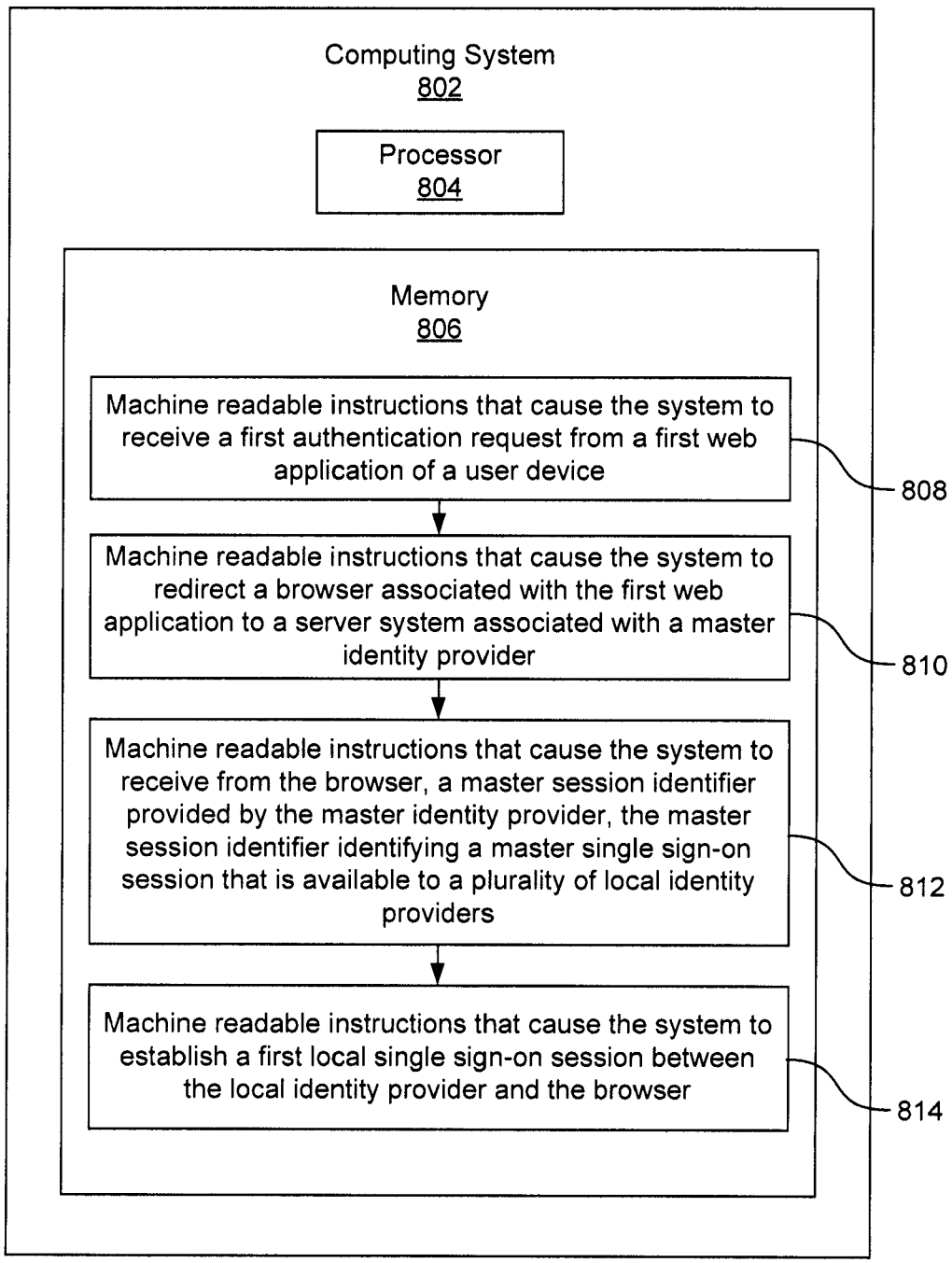
FIG. 8 is a diagram showing an illustrative system for single sign-on management, according to one example of principles described herein.

FIG. 8 is a diagram showing an illustrative system for single sign-on management. According to the present example, the system 802 includes a processor 804 and a memory 806. The memory 806 includes machine readable instructions 808 that case the system to receive a first authentication request from a first web application of a user device. The memory 806 further includes machine readable instructions 810 that cause the system to redirect a browser associated with the first web application to a server system associated with a master identity provider. The memory 806 further includes machine readable instructions 812 that cause the system to receive from the browser, a master session identifier provided by the master identity provider, the master session identifier identifying a master single sign-on session that is available to a plurality of local identity providers. The memory 806 further includes machine readable instructions 814 that cause the system to establish a first local single sign-on session between the local identity provider and the browser.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
   with a computing system associated with a first local identity provider of a plurality of local identity providers, receiving a first authentication request from a first web application of a user device;
   with the computing system, redirecting a browser associated with the first web application to a server system associated with a master identity provider, wherein the redirecting is in response to determining that there is not already a local single sign-on session for a user of the user device;
   with the computing system, receiving from the browser, a master session identifier provided by the master identity provider, the master session identifier identifying a master single sign-on session that is available to the plurality of local identity providers;
   with the computing system, establishing a first local single sign-on session between the first local identity provider and the browser;
   with the computing system, sending identity information and session information to the master identity provider, wherein the master identity provider associates the session information with master session information;
   with the computing system, receiving a logout request from the first web application;
   with the computing system, sending the logout request to the master identity provider; and
   with the computing system, destroying the first local single sign-on session in response to an instruction from the master identity provider.

2. The method of claim 1, further comprising:
   receiving a second authentication request from the browser; and
   returning an authentication response to the browser if a local single sign-on session already exists.

3. The method of claim 1, wherein receiving the master session identifier includes receiving an identity for a user of the user device.

4. The method of claim 3, wherein establishing the first local single sign-on session is done without further authentication from the user.

5. The method of claim 1, wherein receiving the master session identifier does not include receiving an identity for a user of the user device.

6. The method of claim 5, further comprising, before establishing the first local single sign-on session, requesting authentication credentials from the browser and receiving the authentication credentials from the browser.

7. The method of claim 6, wherein the identity information is provided to the master identity provider through the browser.

8. The method of claim 7, wherein the identity information is provided to the master identity provider through a secure connection between the first local identity provider and the master identity provider.

9. The method of claim 1, further comprising:
   with a second local identity provider, receiving an authentication request from a second web application of the user device; and
   in response to receiving the master session identifier from the master identity provider, establishing a second local single sign-on session between the second local identity provider and the browser.

10. The method of claim 1, wherein each of the plurality of local identity providers have a same user base.

11. A method comprising:
   with a computing system associated with a master identity provider, receiving an authentication request from a browser of a user device on behalf of a first web application;
   with the computing system, determining that no master single sign-on session exists for a user associated with the browser;
   with the computing system, in response to the determining, instructing a local identity provider to obtain credentials from the user;
   with the computing system, providing a master session identifier for the master single sign-on session to the local identity provider, the master session identifier identifying a master single sign-on session that is available to a plurality of local identity providers;
   with the computing system, receiving user identity information and local single sign-on session information from the local identity provider; and
   with the computing system, creating a master single sign-on session and associating the local single sign-on session information and user identity information with the master single-sign on session;
   with the computing system, receiving a logout request from the local identity provider;
   with the computing system, sending instructions to a plurality of local identity providers to destroy single sign-on sessions associated with the master single sign-on session.

12. The method of claim 11, wherein the master identity provider is transparent to the user.

13. A computing system associated with a local identity provider, the computing system comprising:
  a processor; and
  a memory with machine readable instructions that when executed by the processor, cause the system to:
    receive a first authentication request from a first web application of a user device;
    redirect a browser associated with the first web application to a server system associated with a master identity provider, wherein the redirecting is in response to determining that there is not already a local single sign-on session for a user of the user device;
    receive from the browser, a master session identifier provided by the master identity provider, the master session identifier identifying a master single sign-on session that is available to a plurality of local identity providers;
    establish a first local single sign-on session between the local identity provider and the browser;
    send identity information and session information to the master identity provider, wherein the master identity provider associates the session information with master session information;
    receive a logout request from the first web application;
    send the logout request to the master identity provider; and
    destroy the first local single sign-on session in response to an instruction from the master identity provider.

14. The system of claim 13, wherein a protocol for communications between the local identity provider and the master identity provider is one of: SAML, OpenID Connect, or OAuth.

15. The system of claim 13, wherein the local identity provider manages identity based on one of: a username/password, client certificate, and social login.

* * * * *